UNITED STATES PATENT OFFICE.

HYLEMAN ALISON WEBSTER, OF COLUMBIA, TENNESSEE.

PROCESS OF PRODUCING PYROPHOSPHATES.

1,346,148.　　Specification of Letters Patent.　　Patented July 13, 1920.

No Drawing.　　Application filed September 24, 1919. Serial No. 325,879.

*To all whom it may concern:*

Be it known that I, HYLEMAN ALISON WEBSTER, a citizen of the United States, residing at Columbia, in the county of Maury and State of Tennessee, have invented certain new and useful Improvements in Processes of Producing Pyrophosphates; and I do hereby declare the following to be a full, clear, and exact description of the invention, such as will enable others skilled in the art to which it appertains to make and use the same.

This invention relates to a process of producing pyrophosphates and has for its object to provide a method which will be more simple and less costly in carrying it out than those heretofore proposed.

With these and other objects in view the invention consists in the novel steps and combinations of steps constituting the process all as will be more fully hereinafter disclosed and particularly pointed out in the claims.

In order that the precise invention may be the more clearly understood it is said:—

The production of pyrophosphates, by the prior methods, with which I am familiar, has involved a comparatively expensive and tedious procedure in that the reagents employed are more or less costly, and in so far as I am aware, a continuous process has not been developed.

One of the established methods may be illustrated by that employed in the production of magnesium pyrophosphate, for example, and which involves the treatment of a solution of magnesium chlorid $MgCl_2$, with a solution of acid sodium phosphate, $Na_2HPO_4$, and ammonia, whereupon a reaction takes place in accordance with the following equation:—

$$MgCl_2 + Na_2HPO_4 + NH_3 = NH_4MgPO_4 + 2NaCl$$

The resulting ammonium magnesium phosphate is then calcined to produce the desired pyrophosphate in accordance with the following equation:—

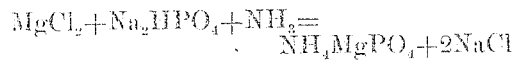
$$2NH_4MgPO_4 + heat = Mg_2P_2O_7 + 2NH_3 + H_2O$$

In addition to the relatively high cost of materials employed in the foregoing procedure the ammonium magnesium phosphate $NH_4MgPO_4$ precipitate obtained from the first equation, is exceedingly finely divided, and therefore very hard to wash.

In fact, the entire process from an industrial standpoint is expensive and also inefficient in its results.

I have discovered, on the other hand, that pyrophosphates may be produced directly without calcination and by a process which is practically continuous from a commercial standpoint. My said new process will be better understood when it is pointed out that if mono-calcium phosphate is treated with an acid such for example as sulfuric acid, a reaction takes place which may be indicated as follows:—

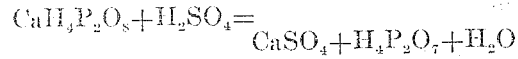
$$CaH_4P_2O_8 + H_2SO_4 = CaSO_4 + H_4P_2O_7 + H_2O$$

The pyrophosphoric acid $H_4P_2O_7$ thus obtained, however, will not remain as such in the presence of the water of the reaction, but will combine with said water to produce the orthophosphoric acid $H_6P_2O_8$. In other words, when pyrophosphoric acid dissociates in solution it produces ions of orthophosphoric acid. Consequently when pyrophosphoric acid in solution is mixed with a base, the salts of orthophosphoric acid are, in the main, the resulting compounds. That is to say, pyrophosphoric acid will very quickly take up water and change to orthophosphoric acid when water is present in any form and especially in the presence of impurities, or other acids which seem to act as catalyzers to facilitate the combination of pyrophosphoric acid with water.

It follows from this that no pure pyrophosphate can be readily made from pyrophosphoric acid, whether the said acid is made in the well known way, by expelling water first from orthophosphoric acid to make metaphosphoric acid and then expelling the water from the metaphosphoric acid to make pyrophosphoric acid, or by employing mono-calcium phosphate or its equivalent, for, as is shown above, said acid totally, or in part, changes to orthophosphoric acid before it can be made to combine with a base to make a pyrophosphate.

Accordingly, in carrying out my invention, I react, for example, upon mono-calcium phosphate, $CaH_4P_2O_8$, with a salt having a more strongly basic ion than the calcium ion present, and combined with a weaker acid than pyrophosphoric acid, so that I get rid of the calcium constituent as well as the $H_2O$ constituent, in a single operation, and produce a pure pyrophosphate at once.

As an example of the carrying out of my process I may take a solution of mono-calcium phosphate, preferably of about 20° Bé., and at a temperature say not exceeding 60° C., and pour the same into a solution of magnesium acetate, $Mg(C_2H_3O_2)_2$ of about the same temperature, and of the proper strength to complete the reciprocal interchange of the acid and basic ions of the salts to the end that a precipitate of magnesium pyrophosphate $Mg_2P_2O_7$ will be produced.

The solution will contain a mixture of calcium acetate and acetic acid as will be clear from the following equation:—

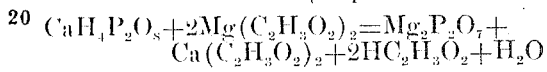

I have further discovered that the foregoing principles are applicable to a large number of metal, and other salts, having a more strongly basic ion than calcium combined with a weaker acid than pyrophosphoric acid, so that they will react in the same way and give insoluble pyrophosphates. In fact, I have found that the acetates of the metals in general and semi-metals are particularly suitable to this process. When acetic acid is employed it forms calcium acetate mixed with acetic acid and it is very easily pressed or washed out, or otherwise separated from the precipitated pyrophosphate.

Furthermore, the solution containing the mixture of calcium acetate and acetic acid can be used to make new acetates and thus the process continued. Should carbonates of the metals be employed in connection with the acetic acid and calcium acetate solutions, a by-product of calcium carbonate is produced and it can be mixed with the mono-calcium phosphate. For example, I may make an acetate from the solution containing the mixture of calcium acetate and acetic acid in accordance with the following equation:—

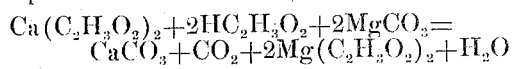

Hence the resulting solution containing the $MgC_4H_6O_4$ can be used again with the mono-calcium phosphate in accordance with the procedure set forth above. I find it advantageous to allow the mixture of mono-calcium phosphate and the acid to stand quite a while after the reactions are complete because the pyrophosphate will take on water of crystallization and form a fine precipitate of the spherical crystal form which is larger in size and much more easily washed free from the calcium acetate and the acetic acid in the solution.

It will now be clear from the foregoing that my method of producing pyrophosphates is more simple than the prior methods, and that the said pyrophosphates are made in substantially one step or reaction, while the other methods require two or more steps or reactions.

Many other examples of my invention could be given wherein reactions involving other acid ions than those of acetic are employed, but it is believed that the above will be sufficient to show that the ions of organic acids derived from soluble organic salts in general are to be expected to function in such a manner as to produce the corresponding pyrophosphates when they react on mono-calcium phosphate.

Therefore, it will be obvious that those skilled in the art may vary the details of the process as well as the constituents employed without departing from the spirit of the invention, and accordingly, I do not wish to be limited to the above disclosure except as may be required by the claims.

What I claim is:—

1. The process of making pyrophosphates from mono-calcium phosphate, which consists in reacting upon the latter with a salt having a stronger basic ion than the calcium ion present and a weaker acid ion than that of pyrophosphoric acid, substantially as described.

2. The process of making a pyrophosphate from mono-calcium phosphate, which consists in reacting on the latter with an acetate having a stronger basic ion than the calcium ion present, substantially as described.

3. The process of making magnesium pyrophosphate which consists in reacting on mono-calcium phosphate with magnesium acetate, substantially as described.

4. The process of making magnesium pyrophosphate which consists in reacting on mono-calcium phosphate of substantially 20° Bé., with magnesium acetate at a temperature of substantially 60° C., substantially as described.

In testimony whereof I affix my signature, in presence of two witnesses.

HYLEMAN ALISON WEBSTER.

Witnesses:
R. M. MARTIN,
W. A. GRAY.